C. H. PORTER.
Assignor to WM. R. CLOUGH.
BOTTLE STOPPER-FASTENERS.
No. 7,424. Reissued Dec. 12, 1876.
Fig. 3.
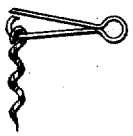
Fig. 1.
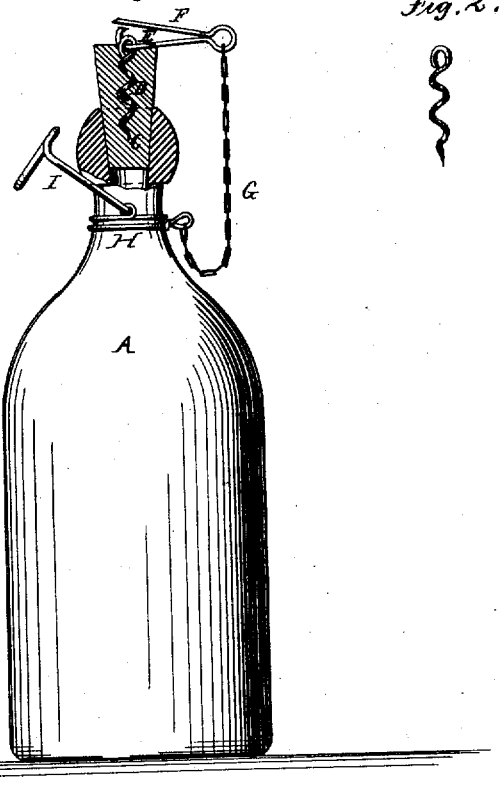
Fig. 2.
Witnesses;
Grenville Lewis
Chas. H. Gill
Inventor
Charles H. Porter
by his attorneys
Cox & Cox.
THE GRAPHIC CO. N.Y.

UNITED STATES PATENT OFFICE.

CHARLES H. PORTER, OF ALBANY, NEW YORK, ASSIGNOR TO WM. R. CLOUGH, OF NEWARK, NEW JERSEY.

IMPROVEMENT IN BOTTLE-STOPPER FASTENERS.

Specification forming part of Letters Patent No. 67,346, dated July 30, 1867; reissue No. 7,424, dated December 12, 1876; application filed August 7, 1876.

*To all whom it may concern:*

Be it known that I, CHAS. H. PORTER, of Albany, in the county of Albany and State of New York, have invented certain new and useful Improvements in Cork-Handles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

With bottles and other liquid receptacles having stopple-necks, more particularly those filled with soda-water and other effervescent fluids, the corks are usually expelled from the bottles by the action of such liquids, when the holding-loop employed is turned aside, or the wire or other fastening cut, the corks thus expelled being in a great proportion lost.

The object of the present invention is to prevent the waste of corks in various ways, by providing a cheap and efficient metallic handle and screw for the same, which may be inserted with ease, and readily attached to a chain or band fastened to the neck of the bottle, if desired.

The invention consists in the use of one or more wires or bands of metal, of such shape that it or they can be firmly connected with the cork by inserting it or them into or through the same, and furnished with an eye, or loop, or other suitable conformation at the outer end of the cork. Although there are, obviously, various modes of constructing such a device, I prefer to take a single piece of metal and twist or coil one end of it into a suitable screw, utilizing the other end of the same piece, by turning or bending it, to form an eye, or loop, or other suitable conformation, constituting a proper head or hook. To the head of this screw there may be attached a band or chain, connected with the neck of the bottle.

In the accompanying plates of drawings my improvements in cork-handles are illustrated.

Figure 1 is a perspective view of my device complete, together with a bottle, illustrating its use. Fig. 2 shows the device D, formed of a single piece of wire. Fig. 3 is a detached view of the device D, with the catch or supplemental handle F.

A in the drawings represents a bottle; B, its mouth, having a cork, C, driven into it. In this cork C a spiral-shaped wire, D, is secured, by screwing it into the same at its upper end toward the lower, the outer end of this wire being provided with a loop or eye, E; F, a spring-catch, hung on one end of a chain, G, which is, at its other end, hung to a metallic wire or band, H, secured around the neck of the bottle; I, the ordinary loop-fastening for corks of soda-water bottles.

I do not claim, broadly, a screw permanently attached to corks, as I am aware that it has been used before; but What I do claim as new, and desire to secure by Letters Patent, is—

1. A cork-handle, formed of a single piece of wire, twisted spirally at one end and formed into an eye or loop at the other.

2. The combination of a cork-handle formed of a single piece of wire twisted spirally at one end and formed into an eye or loop at the other, with a swinging catch.

3. A cork-handle, formed of a single piece of wire twisted spirally at one end and formed into an eye or loop at the other, the screw being inserted in a cork and employed as a means of manipulating the cork.

4. A screw furnished with an eye or loop at one end, the screw being inserted in a cork, substantially as and for the purpose described.

5. The combination of the screw D, secured in the cork C, with a spring-catch, hung to the neck of a bottle, substantially as described.

In testimony that I claim the foregoing I have hereunto set my hand this 3d day of February, 1876.

CHARLES H. PORTER.

Witnesses:

LEDYARD COGSWELL,
S. E. WELLS.